(12) United States Patent
Aoki

(10) Patent No.: US 12,337,906 B2
(45) Date of Patent: Jun. 24, 2025

(54) STEERING CONTROL DEVICE, STEERING CONTROL METHOD, AND NON-TRANSITORY COMPUTER READABLE STORAGE MEDIUM

(71) Applicant: DENSO CORPORATION, Kariya (JP)

(72) Inventor: Takashi Aoki, Kariya (JP)

(73) Assignee: DENSO CORPORATION, Kariya (JP)

( * ) Notice: Subject to any disclaimer, the term of this patent is extended or adjusted under 35 U.S.C. 154(b) by 316 days.

(21) Appl. No.: 18/173,459

(22) Filed: Feb. 23, 2023

(65) Prior Publication Data

US 2023/0192181 A1 Jun. 22, 2023

Related U.S. Application Data

(63) Continuation of application No. PCT/JP2021/029255, filed on Aug. 6, 2021.

(30) Foreign Application Priority Data

Aug. 31, 2020 (JP) .................................. 2020-145430

(51) Int. Cl.
*B62D 5/04* (2006.01)
*B62D 15/02* (2006.01)

(52) U.S. Cl.
CPC ............. *B62D 5/046* (2013.01); *B62D 15/02* (2013.01); *B62D 15/025* (2013.01)

(58) Field of Classification Search
CPC .... B62D 5/046; B62D 15/025; B62D 5/0457; B62D 5/0466; B62D 15/02; B62D 15/0205

See application file for complete search history.

(56) References Cited

U.S. PATENT DOCUMENTS

2014/0229068 A1* 8/2014 Ueyama ................ B60W 10/20
701/41

FOREIGN PATENT DOCUMENTS

| JP | 2009-208551 A | 9/2009 |
|---|---|---|
| JP | 2019-098810 A | 6/2019 |

* cited by examiner

*Primary Examiner* — Jacob M Amick
(74) *Attorney, Agent, or Firm* — Maschoff Brennan

(57) ABSTRACT

A steering control device for a steering member and a turning wheel, includes: a steering angle control unit for controlling an actual steering angle of the steering member via a steering actuator; a turning angle control unit for controlling an actual turning angle of the turning wheel via a turning actuator; and a target generation unit for generating a target steering angle as a control target and a target turning angle as a control target. Before controlling the actual turning angle toward the target turning angle to follow a planned trajectory for the vehicle, the steering angle control unit controls the actual steering angle toward the target steering angle to follow the planned trajectory.

20 Claims, 16 Drawing Sheets

STEERING CONTROL DEVICE, STEERING CONTROL METHOD, AND NON-TRANSITORY COMPUTER READABLE STORAGE MEDIUM

CROSS REFERENCE TO RELATED APPLICATIONS

The present application is a continuation application of International Patent Application No. PCT/JP2021/029255 filed on Aug. 6, 2021, which designated the U.S. and claims the benefit of priority from Japanese Patent Application No. 2020-145430 filed on Aug. 31, 2020. The entire disclosures of all of the above applications are incorporated herein by reference.

TECHNICAL FIELD

The present disclosure relates to steering control technology in vehicles.

BACKGROUND

In a steering control technique according to a conceivable technique, the movement of the steering wheel by the VGRS motor and the movement of the turning wheels by the EPS motor can be interlocked by automatic turning control of the vehicle.

SUMMARY

According to an example, a steering control device for a steering member and a turning wheel, may include: a steering angle control unit for controlling an actual steering angle of the steering member via a steering actuator; a turning angle control unit for controlling an actual turning angle of the turning wheel via a turning actuator; and a target generation unit for generating a target steering angle as a control target and a target turning angle as a control target. Before controlling the actual turning angle toward the target turning angle to follow a planned trajectory for the vehicle, the steering angle control unit controls the actual steering angle toward the target steering angle to follow the planned trajectory.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
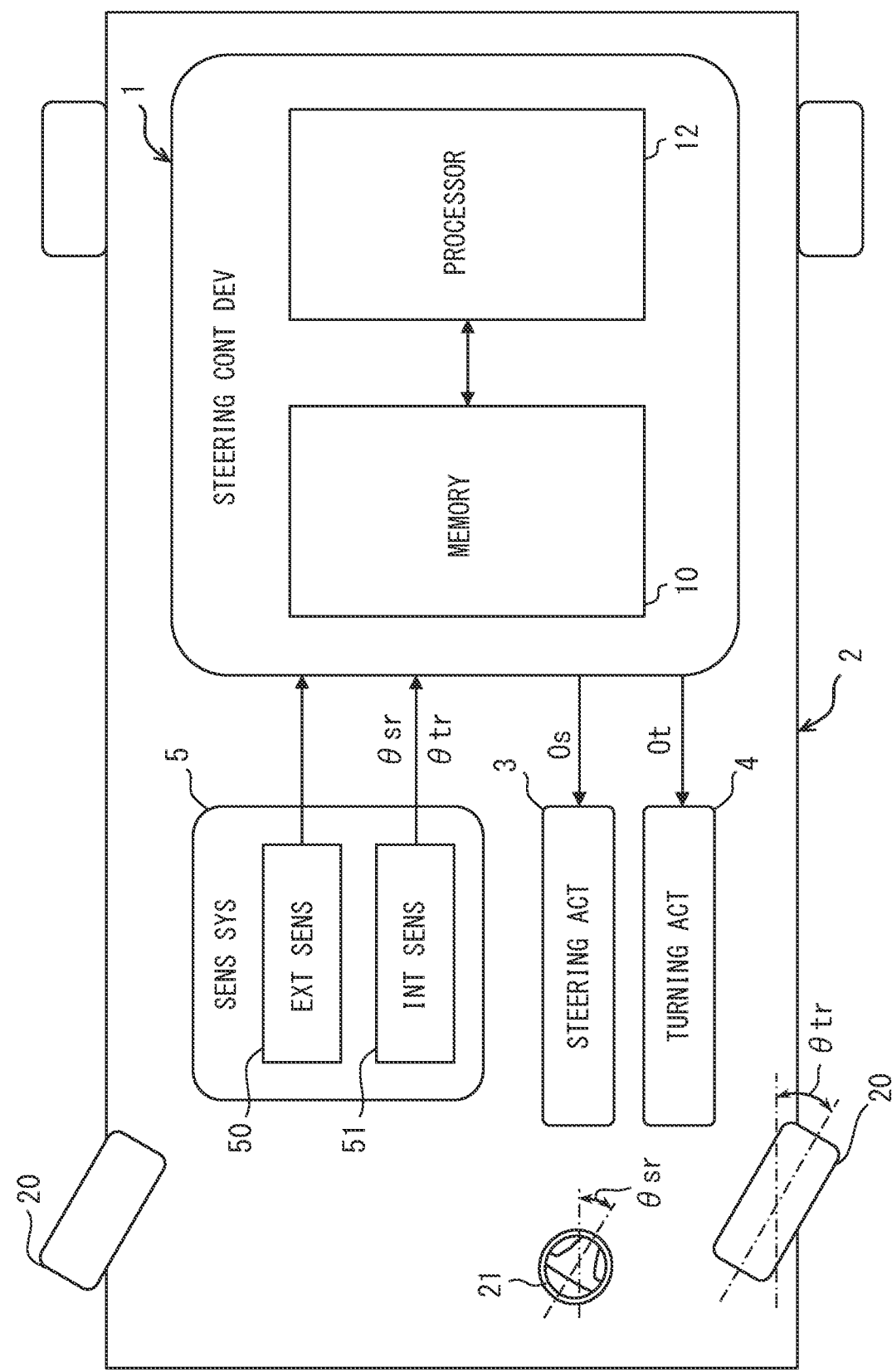
FIG. 1 is a schematic diagram showing a vehicle equipped with a steering control device according to a first embodiment.

In the steering control technique according to the conceivable technique, the current turning state is notified to the occupant through the steering wheel by automatic turning control. However, even with such notification, it may be difficult for the occupant to grasp the behavior of the vehicle in the future. On the other hand, the automatic driving mode of vehicles, which has been attracting attention in recent years, is expected to reduce such anxiety about future behavior.

The present embodiments provide a steering control device that enhances a sense of security in an automatic driving mode of a vehicle. The present embodiments further provide a steering control method that enhances a sense of security in an automatic driving mode of a vehicle. The present embodiments further provide a steering control program that enhances the sense of security in the automatic driving mode of the vehicle.

Hereinafter, technical means of the present embodiments for solving the difficulties will be described.

According to the present embodiments, a steering control device interlocks a movement of a steering member by a steering actuator and a movement of a turning wheel by a turning actuator in an automatic driving mode of a vehicle. The steering control device includes:
- a steering angle control unit that controls an actual steering angle of the steering member via the steering actuator;
- a turning angle control unit that controls an actual turning angle of the turning wheel via the turning actuator; and a target generation unit that generates a target steering angle, which is a control target for the actual steering angle, and a target turning angle, which is a control target for the actual turning angle.

Before the turning angle control unit controls the actual turning angle toward the target turning angle to follow a planned trajectory of the vehicle, the steering angle control unit controls the actual steering angle toward the target steering angle to follow the planned trajectory.

According to present embodiments, a steering control method provides to interlock a movement of a steering member by a steering actuator and a movement of a turning wheel by a turning actuator in an automatic driving mode of a vehicle.

The steering control method includes:
a steering angle control step for controlling an actual steering angle of the steering member via the steering actuator;
a turning angle control step for controlling an actual turning angle of the turning wheel via the turning actuator; and
a target generation step for generating a target steering angle, which is a control target for the actual steering angle, and a target turning angle, which is a control target for the actual turning angle.

Before the actual turning angle is controlled toward the target turning angle to follow a planned trajectory of the vehicle in the turning angle control step, the actual steering angle is controlled toward the target steering angle to follow the planned trajectory in the steering angle control step.

According to present embodiments, a steering control program includes instructions to be executed by a processor in order to interlock a movement of a steering member by a steering actuator and a movement of a turning wheel by a turning actuator in an automatic driving mode of a vehicle.

The instructions include:
a steering angle control step for controlling an actual steering angle of the steering member via the steering actuator;
a turning angle control step for controlling an actual turning angle of the turning wheel via the turning actuator; and
a target generation step for generating a target steering angle, which is a control target for the actual steering angle, and a target turning angle, which is a control target for the actual turning angle.

Before the actual turning angle is controlled toward the target turning angle to follow a planned trajectory of the vehicle in the turning angle control step, the actual steering angle is controlled toward the target steering angle to follow the planned trajectory in the steering angle control step.

According to these present embodiments, before the actual turning angle of the turning wheel is controlled toward the target turning angle to follow a planned trajectory of the vehicle, the actual steering angle of the steering member is controlled toward the target steering angle to follow the planned trajectory. Accordingly, an occupant of the vehicle can be notified in advance of the actual steering angle that corresponds to the future actual turning angle through the steering member. Therefore, it is possible to increase the sense of security for the future behavior of the occupants in the automatic driving mode of the vehicle.

Hereinafter, embodiments will be described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

As shown in FIG. 1, a steering control device 1 according to a first embodiment is mounted in a vehicle 2. The vehicle 2 is capable of executing a constant or temporary autonomous driving in an automatic driving mode. Here, the automatic driving mode may be achieved with an autonomous operation control, such as conditional driving automation, advanced driving automation, or full driving automation, where the system in operation performs all driving tasks. The automatic driving mode may be achieved with an advanced driving assistance control, such as driving assistance or partial driving automation, where the occupant performs some or all driving tasks. The automatic driving mode may be achieved by combining or switching between the autonomous driving control and the advanced driving assistance control.

Figure 2:
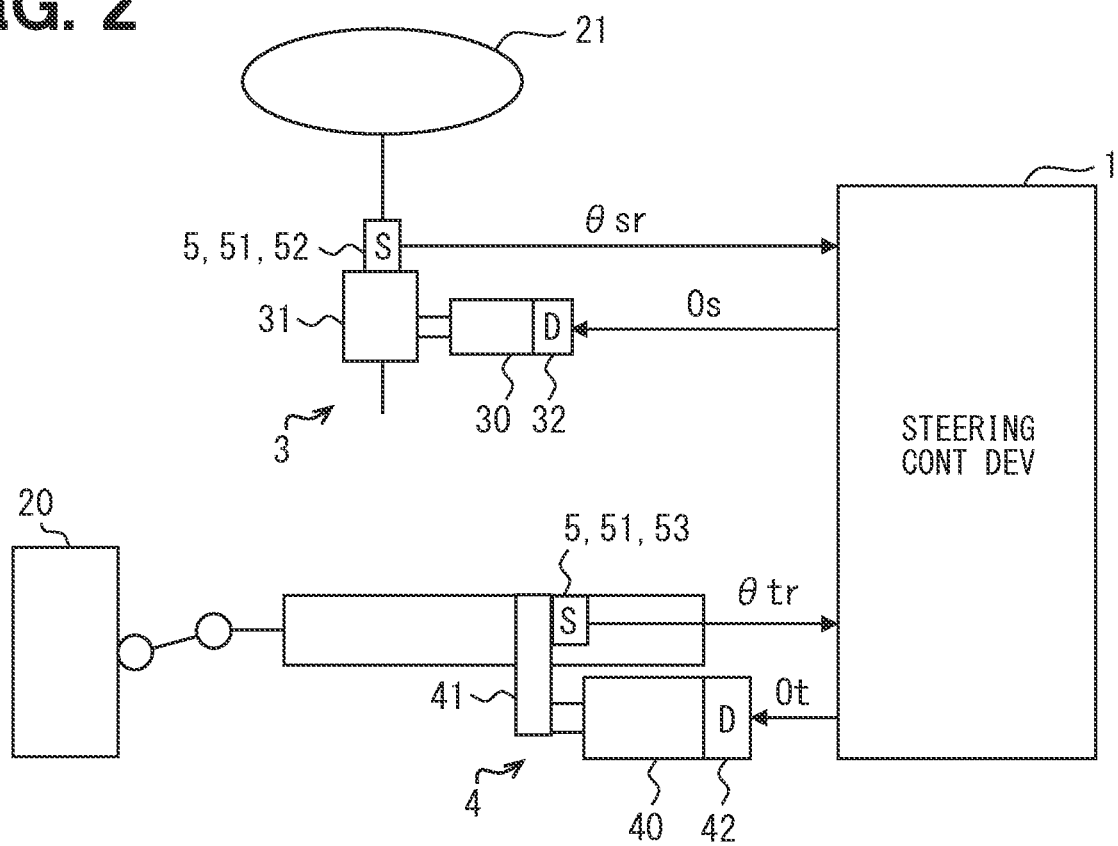
FIG. 2 is a schematic diagram showing the overall configuration of the steering control device according to the first embodiment.
Figure 3:
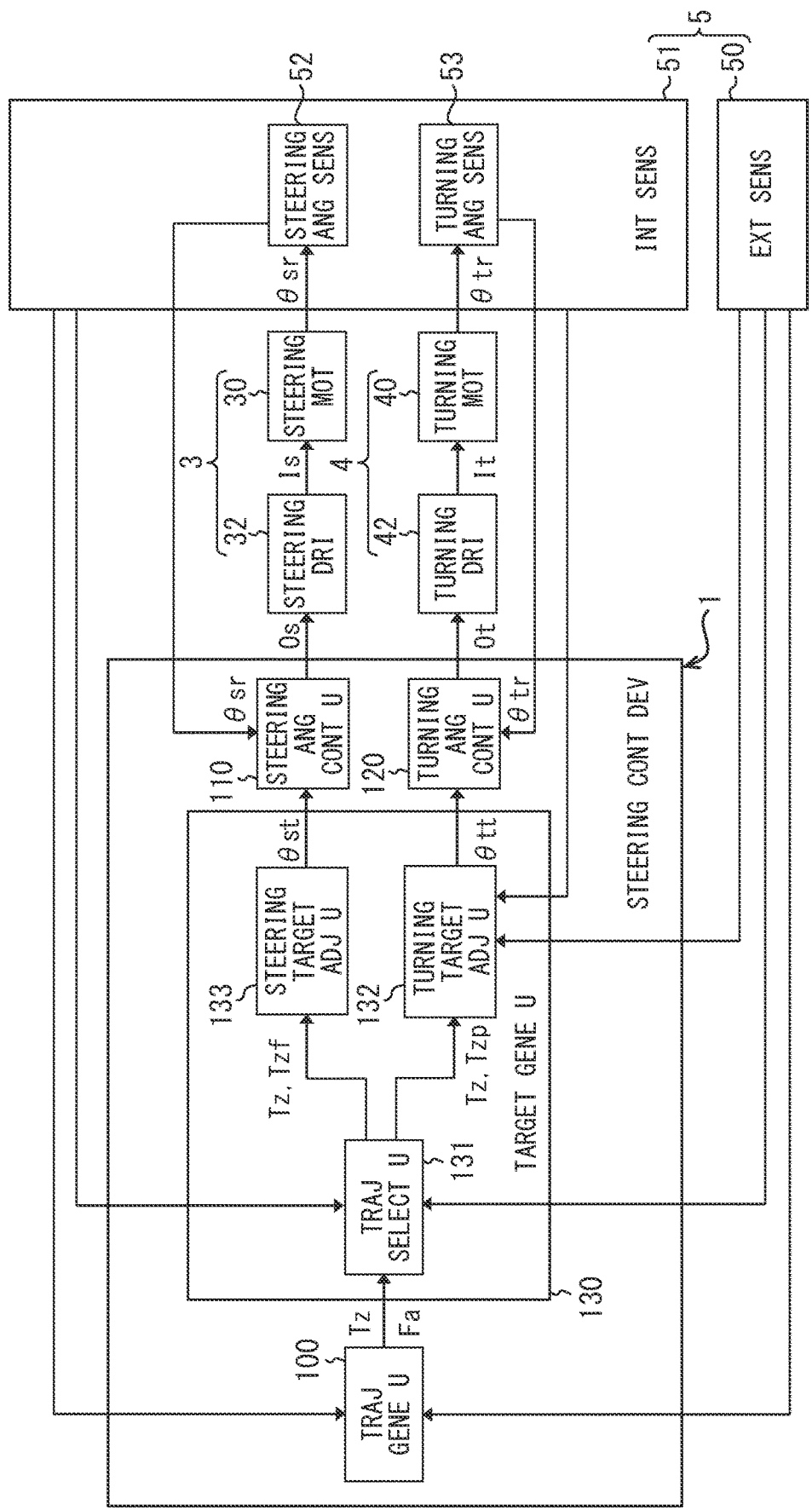
FIG. 3 is a block diagram showing a detail configuration of the steering control device according to the first embodiment.

At least one pair of turning wheels 20 among the wheels of the vehicle 2 can be turned under the control of the steering control device 1. A steering wheel 21, which is a steering member of the vehicle 2, can be held by an occupant in the vehicle compartment. A steering actuator 3, a turning actuator 4, and a sensor system 5 are mounted on the vehicle 2 together with the steering control device 1. As shown in FIGS. 2 and 3, the steering actuator 3 includes a steering motor 30, a steering speed reducer 31 and a steering driver 32. The steering actuator 3 is mechanically associated with the steering wheel 21 of the vehicle 2.

The steering actuator 3 controls a current Is applied to an electric steering motor 30 by a steering driver 32 according to an instruction value Os (see FIG. 1) from the steering control device 1. The steering actuator 3 generates a steering torque by a steering motor 30 to which a current Is is applied. The steering actuator 3 amplifies the steering torque generated by the steering motor 30 using a steering speed reducer 31 such as a planetary gear and then outputs the amplified steering torque. The output steering torque is transmitted from the steering actuator 3 to the steering wheel 21 as a reaction force, so that the actual steering angle θsr (see FIG. 1) of the steering wheel 21 can be changed.

Here, the actual steering angle θsr and its target steering angle θst are given a positive (i.e., plus) value on the right side and a negative (i.e., minus) value on the left side with respect to the front-rear direction of the vehicle 2, respectively. Similarly, the instruction value Os to the steering actuator 3 is given a positive or negative value.

The turning actuator 4 includes a turning motor 40, a turning speed reducer 41 and a turning driver 42. The turning actuator 4 is mechanically linked to the turning wheels 20 of the vehicle 2. The turning actuator 4 constitutes a steer-by-wire system that mechanically disconnects and electrically cooperates with the steering wheel 21 and the steering actuator 3.

The turning actuator 4 controls a current It applied to an electric turning motor 40 by a turning driver 42 according to an instruction value Ot (see FIG. 1) from the steering control device 1. The turning actuator 4 generates a turning torque by a turning motor 40 to which a current It is applied. The turning actuator 4 amplifies the turning torque generated by the turning motor 40 by a turning speed reducer 41 such as a rack gear, and then outputs the amplified turning torque. The output turning torque is transmitted from the turning actuator 4 to the turning wheels 20 as driving force, thereby changing the actual turning angle θtr (see FIG. 1) of the turning wheels 20.

Here, the actual turning angle θtr and its target turning angle θtt are given a positive (i.e., plus) value on the right side and a negative (i.e., minus) value on the left side with respect to the front-rear direction of the vehicle 2, respectively. Similarly, the instruction value Ot to the turning actuator 4 is given a positive or negative value.

As shown in FIGS. 1 to 3, the sensor system 5 includes an external sensor 50 and an internal sensor 51. The external sensor 50 is configured to acquire information about the outside of the vehicle 2, which is the surrounding environment of the vehicle 2. The external sensor 50 may acquire the external information by detecting an object existing in the outside of the vehicle 2. The external sensor 50 of the detection type is at least one of a camera, a LIDAR (Light Detection and Ranging/Laser Imaging Detection and Ranging), a radar, sonar, and the like, for example. The external sensor 50 may acquire the external information by receiving a signal from an artificial satellite of a GNSS (Global Navigation Satellite System) present in the outside of the vehicle 2 or a signal from a roadside device of ITS (Intelligent Transport Systems). The external sensor 50 of the signal reception type is at least one of, for example, a GNSS receiver, a telematics receiver, and the like.

The internal sensor 51 is configured to acquire information about the inside of the vehicle 2, which is the internal environment of the vehicle 2. The internal sensor 51 may acquire the internal information by detecting a specific motion physical quantity in the inside of the vehicle 3. The physical quantity detection type internal sensor 51 is, for example, a steering angle sensor 52, a turning angle sensor 53, a speed sensor, an acceleration sensor, an inertia sensor, a yaw rate sensor, and the like, and includes at least sensors 52 and 53. Here, the steering angle sensor 52 acquires the actual steering angle θsr of the steering wheel 21. The turning angle sensor 53 acquires the actual turning angle θtr of the turning wheels 20.

The steering control device 1 is connected with the steering actuator 3, the turning actuator 4 and the sensor system 5 through at least one of LAN (Local Area Network), a wire harness, an internal bus, or the like. The steering control device 1 includes at least one dedicated computer. The dedicated computer that constitutes the steering control device 1 may be a driving control ECU (Electronic Control Unit) that implements driving control including an automatic operation mode. The dedicated computer that constitutes the steering control device 1 may be at least one of a steering ECU that controls the steering actuator 3 and a turning ECU that controls the turning actuator 4. The dedicated computer that constitutes the steering control device 1 may be a locator ECU that estimates state quantities of the vehicle 2 including the position of the vehicle 2. The dedicated computer of the steering control device 1 may be a navigation ECU configured to navigate the driver of the vehicle 2. The dedicated computer that constitutes the steering control device 1 may be an HCU (i.e., HMI (i.e., Human Machine Interface) Control Unit) that controls information presentation of the vehicle 2.

As shown in FIG. 1, the steering control device 1 includes at least one memory 10 and at least one processor 12 by including such a dedicated computer. The memory 10 is at least one type of non-transitory tangible storage medium, such as a semiconductor memory, a magnetic storage medium, and an optical storage medium, for non-transitory storage of computer readable programs and data. The processor 12 includes, as a core, at least one type of, for example, a CPU (Central Processing Unit), a GPU (Graphics Processing Unit), an RISC (Reduced Instruction Set Computer) CPU, and the like.

The processor 12 executes multiple instructions included in a steering control program stored in the memory 10. Accordingly, the steering control device 1 provides a plurality of functional units, which are functional blocks for interlocking and controlling steering and turning in the vehicle 2, as shown in FIG. 3. As described above, in the steering control device 1, the processor 12 executes a plurality of instructions according to the steering control program stored in the memory 10 so that multiple functional units are established in order to control the steering and turning of the vehicle 2 in conjunction with each other. These multiple functional units include a trajectory generation unit 100, a steering angle control unit 110, a turning angle control unit 120 and a target generation unit 130.

Figure 4:
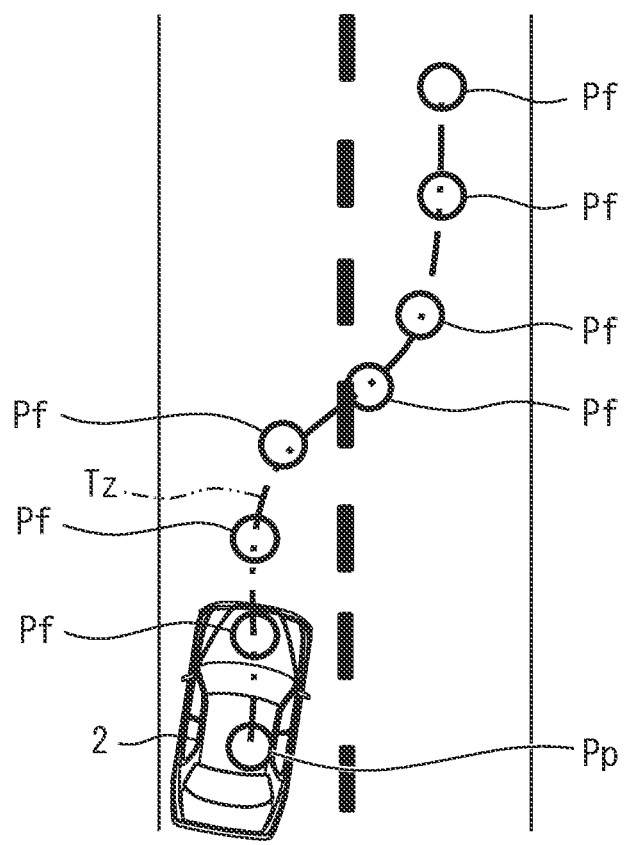
FIG. 4 is a schematic diagram showing a planned trajectory of the steering control device according to the first embodiment.

The trajectory generation unit 100 generates the planned trajectory Tz based on input information from the sensor system 5 or physical information based thereon. As shown in FIG. 4, the planned trajectory Tz indicates a traveling route that defines the time-series change of the self-state quantity of the vehicle 2. In particular, the planned trajectory Tz is generated so as to define self-state quantities from the current control point Pp, which is the current position of the vehicle 2, to a plurality of future control points Pf ahead of the current control point Pp. Here, the self-state quantity is a physical quantity including at least the position of the vehicle 2. Such a self-state quantity may include, for example, at least one of running speed, acceleration, yaw angle, and the like in addition to the position.

The trajectory generation unit 100 shown in FIG. 3 generates flags representing control instructions for requesting a command to the steering angle control unit 110, the turning angle control unit 120, and the target generation unit 130. In particular, the trajectory generation unit 100 generates an automatic driving flag Fa to which various control parameters in the automatic driving mode are added as a flag for executing the automatic driving mode in the driving control of the vehicle 2, and inputs it to at least the target generation unit 130.

The steering angle control section 110 controls the actual steering angle θsr of the steering wheel 21 via the steering actuator 3. Specifically, the target steering angle θst, which is the control target for the actual steering angle θsr, is input from the target generation unit 130 to the steering angle control unit 110. Further, the actual steering angle θsr is input from the steering angle sensor 52 to the steering angle control unit 110. Therefore, the steering angle control unit 110 executes steering angle follow-up control such as PID control to make the actual steering angle θsr follow the target steering angle θst. The instruction value Os given to the steering actuator 3 by the steering angle control unit 110 in this steering angle follow-up control indicates the value of the current Is applied to the steering motor 30 so that the actual steering angle θsr approaches the target steering angle.

The steering actuator 3 thus adjusts the output directed to the steering wheel 21 by following the adjustment instruction value Os from the steering angle control unit 110. As a result, the actual steering angle θsr of the steering wheel 21 is controlled toward the target steering angle θst, and the actual steering angle θsr becomes an angle corresponding to the instruction value Os to the steering actuator 3.

The turning angle control unit 120 controls the actual turning angle θtr of the turning wheels 20 via the turning actuator 4. Specifically, the target turning angle θtt, which is the control target for the actual turning angle θtr, is input from the target generation unit 130 to the turning angle control unit 120. Also, the actual turning angle θtr is input from the turning angle sensor 53 to the turning angle control unit 120. Therefore, the turning angle control unit 120 executes turning angle follow-up control such as PID control to make the actual turning angle θtr follow the target turning angle θtt. The instruction value Ot given to the turning actuator 4 by the turning angle control unit 120 in this turning angle follow-up control indicates a value of the current It applied to the turning motor 40 so that the actual turning angle θtr approaches the target turning angle θtt.

The turning actuator 4 adjusts the output directed to the turning wheels 20 by following the instruction value Ot adjusted by the turning angle control unit 120 in this way. As a result, the actual turning angle θtr of the turning wheels 20 is controlled toward the target turning angle θtt, and the actual turning angle θtr becomes an angle corresponding to the instruction value Ot to the turning actuator 4.

Based on the planned trajectory Tz generated by the trajectory generation unit 100, the target generation unit 130 sets the target steering angle θst, which is the control target of the steering angle control unit 110, and the target turning angle θtt, which is the control target of the turning angle control unit 120. Specifically, the target generation unit 130 has a trajectory selection unit 131, a turning target adjustment unit 132, and a steering target adjustment unit 133 as sub-function units.

Figure 5:
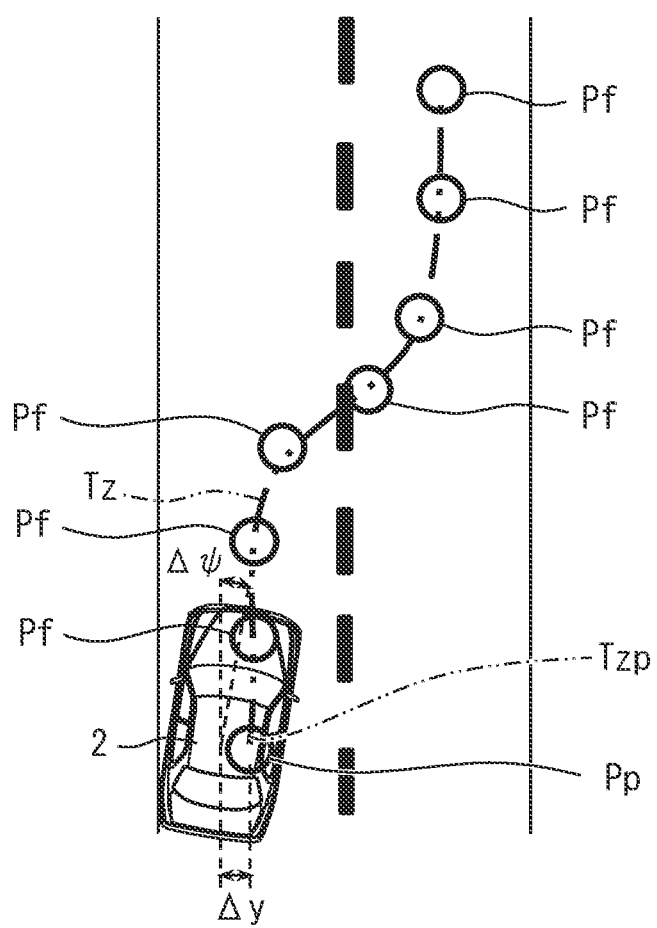
FIG. 5 is a schematic diagram illustrating trajectory selection of the steering control device according to the first embodiment.
Figure 6:
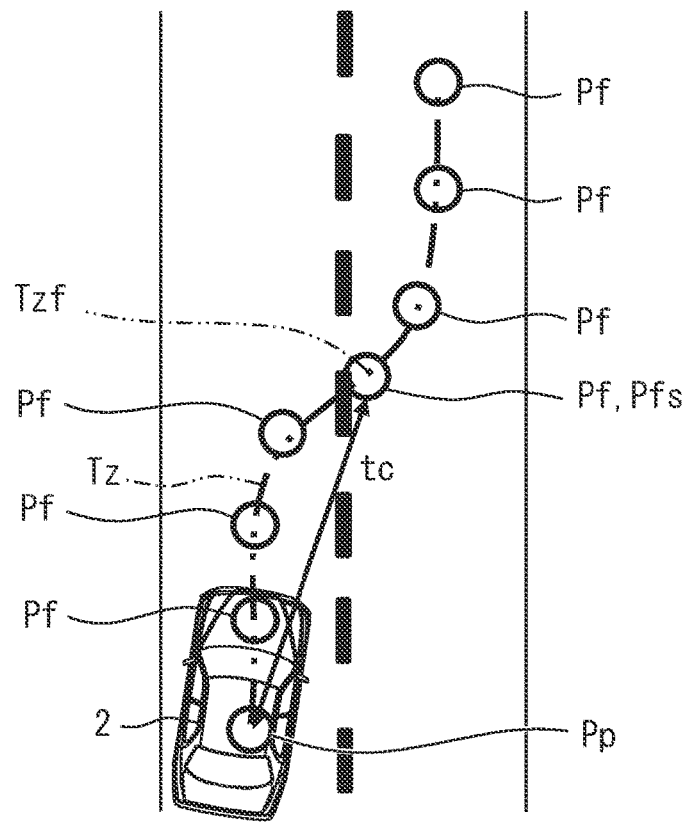
FIG. 6 is a schematic diagram illustrating trajectory selection of the steering control device according to the first embodiment.

The planned trajectory Tz and the automatic driving flag Fa are input from the trajectory generation unit 100 to the trajectory selection unit 131. The trajectory selection unit 131, in a case where the automatic driving flag Fa is input, selects the planned trajectory Tzp at the current control point Pp shown in FIG. 5 as the planned trajectory Tz given to the turning target adjustment unit 132 as shown in FIG. 3. At the same time, when the automatic driving flag Fa is input, the trajectory selection unit 131 selects the planned trajectory Tzf at the specific future control point Pfs shown in FIG. 6 among the future control points Pf after the current control point Pp as the planned trajectory Tz given to the steering target adjustment unit 133 as shown in FIG. 3.

When selecting the planned trajectory Tz to be given to the steering target adjustment unit 133, the trajectory selection unit 131 adjusts the control time tc from the current control point Pp to the specific future control point Pfs. At this time, the trajectory selection unit 131 sets the control time tc between the control points Pp and Pfs to a fixed value or a variable value. The setting of the variable value may be executed according to at least one of the control parameters of the automatic driving mode included in the automatic driving flag Fa, such as the target turning angle θtt, the angular velocity at the target turning angle θtt, the traveling speed, and the yaw rate.

Of the planned trajectories Tz, the planned trajectory Tzp at the current control point Pp is input from the trajectory selection unit 131 to the turning target adjustment unit 132 shown in FIG. 3. The turning target adjustment unit 132 acquires the self-state quantity of the vehicle 2 by estimation processing based on input information from the sensor system 5 or physical information based thereon. Therefore, the turning target adjustment unit 132 executes trajectory follow-up control for causing the self-state quantity to follow the planned trajectory Tzp. Through this trajectory follow-up control, the turning target adjustment unit 132 adjusts the target turning angle θtt to be given to the turning angle control unit 120 so that the self-state quantity approaches the predetermined amount of the planned trajectory Tzp, using a combination of the feed-back control and the feed-forward control.

Figure 7:
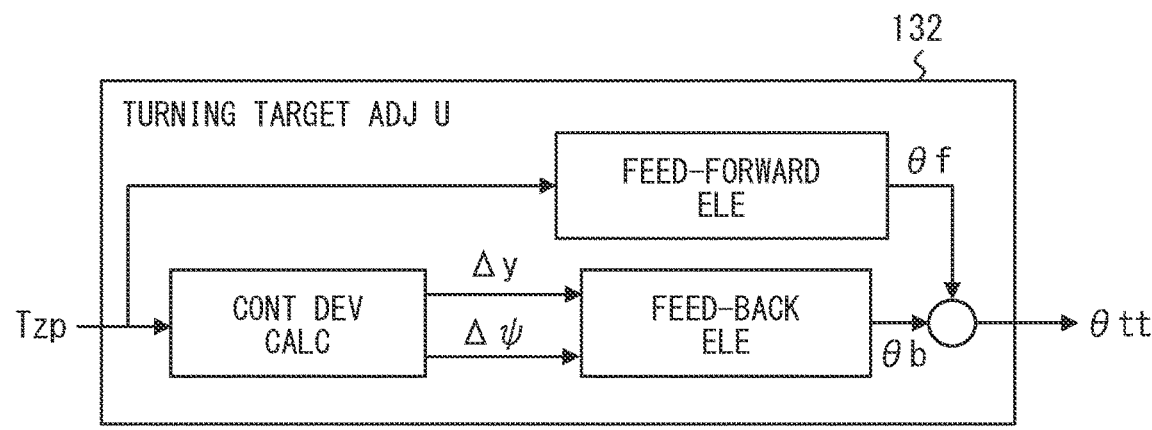
FIG. 7 is a block diagram showing a turning target generation unit of the steering control device according to the first embodiment.

For feedback control, the turning target adjustment unit 132 acquires the lateral deviation Δy and the yaw angle deviation Δψ (see FIGS. 5 and 7) by calculating the control deviation. The lateral deviation Δy is the deviation of the position of the vehicle 2 in the lateral direction among the self-state quantities from the predetermined position defined by the planned trajectory Tzp. The yaw angle deviation Δψ is the deviation between the yaw angle of the vehicle 2 and the predetermined angle of the planned trajectory Tzp among the self-state quantities.

In the feedback control, the turning target adjustment unit 132 converts the integral calculation value of the lateral deviation Δy into an individual control angle based on the integral gain. In the feedback control, the turning target adjustment unit 132 also converts the lateral deviation Δy and the yaw angle deviation Δψ into individual control angles based on the lateral deviation gain and the yaw angle deviation gain, respectively. In the feedback control, the turning target adjustment unit 132 generates the feedback angle θb by adding these individual control angles.

On the other hand, in the feedforward control, the turning target adjustment unit 132 converts the curvature on the planned trajectory Tzp into the feedforward angle θf based on the conversion gain. The turning target adjustment unit 132 generates a target turning angle θtt that follows the planned trajectory Tzp by adding the converted feedforward angle θf to the feedback angle θb.

Figure 8:
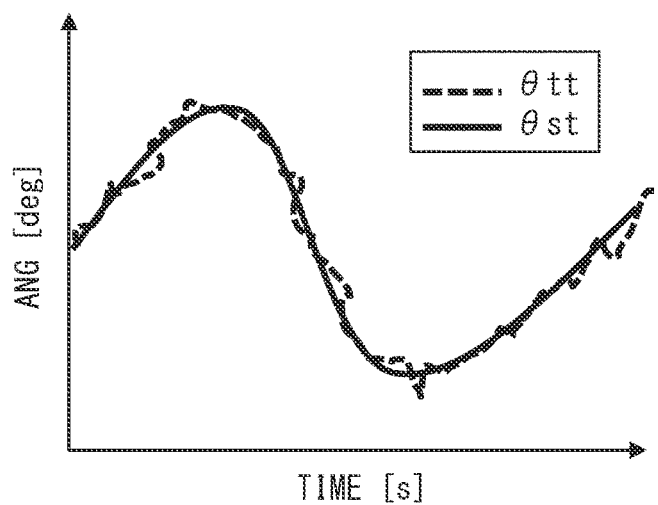
FIG. 8 is a schematic diagram illustrating target generation of the steering control device according to the first embodiment.

Of the planned trajectories Tz, the planned trajectory Tzf at the specific future control point Pfs is input from the trajectory selection unit 131 to the turning target adjustment unit 133 shown in FIG. 3. The steering target adjustment unit 133 adjusts the target steering angle θst to be given to the steering angle control unit 110 by feedforward control so as to optimize the control of the vehicle 2 according to the planned trajectory Tzf at the specific future control point Pfs. As a result, as shown in FIG. 8, the target steering angle θst does not fluctuate due to the noise component of the input information from the sensor system 5 or the physical information based thereon, compared to the target turning angle θtt using the feedback control, and the angle θst is smoothed.

In the feedforward control, the steering target adjustment unit 133 may adjust the angular velocity at the target steering angle θst at the specific future control point Pfs so that the control of the vehicle 2 is also optimized. Here, the angular velocity adjustment at the target steering angle θst may be realized by adjusting the conversion ratio of the target steering angle θst to the target turning angle θtt as control angle ratio adjustment between the actuators 3 and 4, for example.

With such a configuration, in synchronism with the generation of the target turning angle θtt at the current control point Pp on the planned trajectory Tz by the turning target adjustment unit 132, the target steering angle θst at the specific future control point Pfs on the same planned trajectory Tz is generated by the steering target adjustment unit 133. As a result, the actual steering angle θsr is controlled toward the target steering angle θst following the planned trajectory Tz earlier than the actual turning angle θtr is controlled toward the target turning angle θtt following the planned trajectory Tz.

Figure 9:
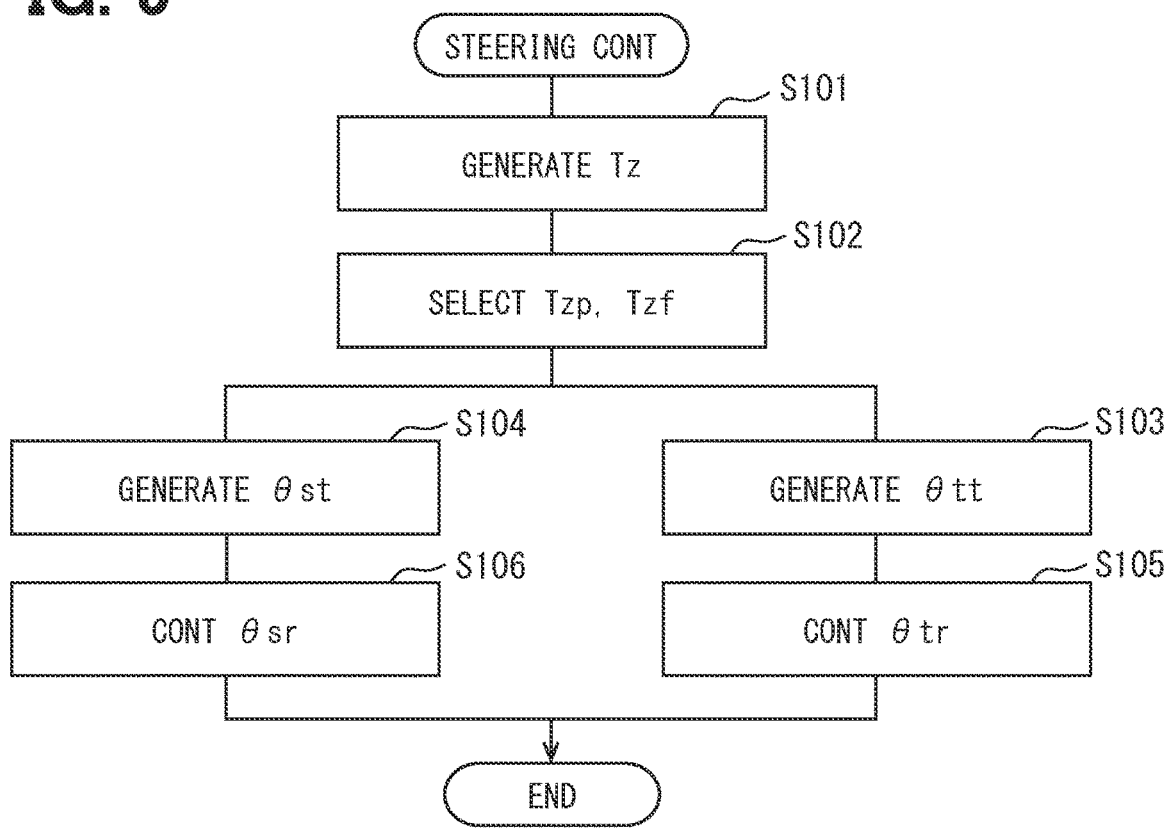
FIG. 9 is a flowchart illustrating a steering control method according to the first embodiment.

The trajectory generation unit 100, the steering angle control unit 110, the turning angle control unit 120, and the target generation unit 130 described above are jointly operated so that the steering control device 1 controls the steering and turning of the vehicle 2 in conjunction with each other. The flow of the steering control method will be explained below according to FIG. 9. This flow is executed in the automatic driving mode. Further, in this flow, "S" means steps of the process executed by instructions included in the steering control program.

In S101, the trajectory generation unit 100 generates a planned trajectory Tz. In S102, the trajectory selection unit 131 of the target generation unit 130 selects the planned trajectory Tzp at the current control point Pp as the planned trajectory Tz to be given to the turning target adjustment unit 132. At the same time, in S102, the trajectory selection unit 131 selects the planned trajectory Tzf at the specific future control point Pfs among the future control points Pf ahead of the current control point Pp as the planned trajectory Tz to be given to the steering target adjustment unit 133. At this time, the trajectory selection unit 131 may variably adjust the control time tc from the current control point Pp to the specific future control point Pfs according to the control parameters in the automatic operation mode.

S103 and S104, both of which follow S102, are synchronously executed in conjunction with each other. In S103, the turning target adjustment unit 132 of the target generation unit 130 generates the target turning angle θtt at the current control point Pp to be input into the turning angle control unit 120 according to the planned trajectory Tzp among the planned trajectories Tz input from the trajectory selection unit 131. In S104, the steering target adjustment unit 133 of the target generation unit 130 generates the target steering angle θst at the specific future control point Pfs to be input into the steering angle control unit 110 according to the planned trajectory Tzf among the planned trajectories Tz input from the trajectory selection unit 131.

S105 and S106, which follow S103 and S104 respectively, are synchronously executed in conjunction with each other. In S105, the turning angle control unit 120 controls the actual turning angle θtr of the turning wheels 20 via the turning actuator 4 to be the target turning angle θtt at the current control point Pp input from the turning target adjustment unit 132. In S106, the steering angle control unit 110 controls the actual steering angle θsr of the steering wheel 21 via the steering actuator 3 toward the target steering angle θst at the specific future control point Pfs input from the steering target adjustment unit 133.

In such a first embodiment, S106 corresponds to the "steering angle control step", S105 corresponds to the "turning angle control step", and S102, S103, and S104 correspond to the "target generation step".

(Operation Effects)

The operation and effects of the first embodiment described above will be described below.

According to the first embodiment, before the actual turning angle θtr of the turning wheels 20 is controlled toward the target turning angle θtt following the planned trajectory Tz of the vehicle 2, the actual steering angle θsr is controlled toward the target steering angle θst following the planned trajectory Tz. Accordingly, the occupant of the vehicle 2 can be informed in advance through the steering wheel 21 of the actual steering angle θsr that will correspond to the future actual turning angle θtr. Therefore, it is possible to increase the sense of security for the future behavior of the occupants in the automatic driving mode of the vehicle 2.

According to the first embodiment, the target steering angle θst at the future control point Pf (specifically, at the specific future control point Pfs) ahead of the current control point Pp on the planned trajectory Tz is generated in conjunction with the generation of the target turning angle θtt at the current control point Pp on the planned trajectory Tz. According to this, since the actual steering angle θtr is controlled according to the target turning angle θtt at the current control point Pp earlier than the actual turning angle θtr is controlled according to the target turning angle θtt at the future control point Pf, the actual steering angle θsr is controlled according to the target steering angle θst at the future control point Pf. Therefore, it is possible to inform the passenger of the future actual steering angle θtr and the corresponding actual steering angle θsr in advance, thereby increasing the sense of security in the automatic driving mode of the vehicle 2.

According to the first embodiment, the control time tc from the current control point Pp to the future control point Pf (specifically, the specific future control point Pfs) may be adjusted according to control parameters in the automatic driving mode. In this case, the passenger can be notified of the future actual steering angle θtr and the corresponding actual steering angle θsr at a time suitable for the automatic driving mode. Therefore, it is possible to increase the sense of security for the future behavior of the occupants in the automatic driving mode of the vehicle 2.

Second Embodiment

Figure 10:
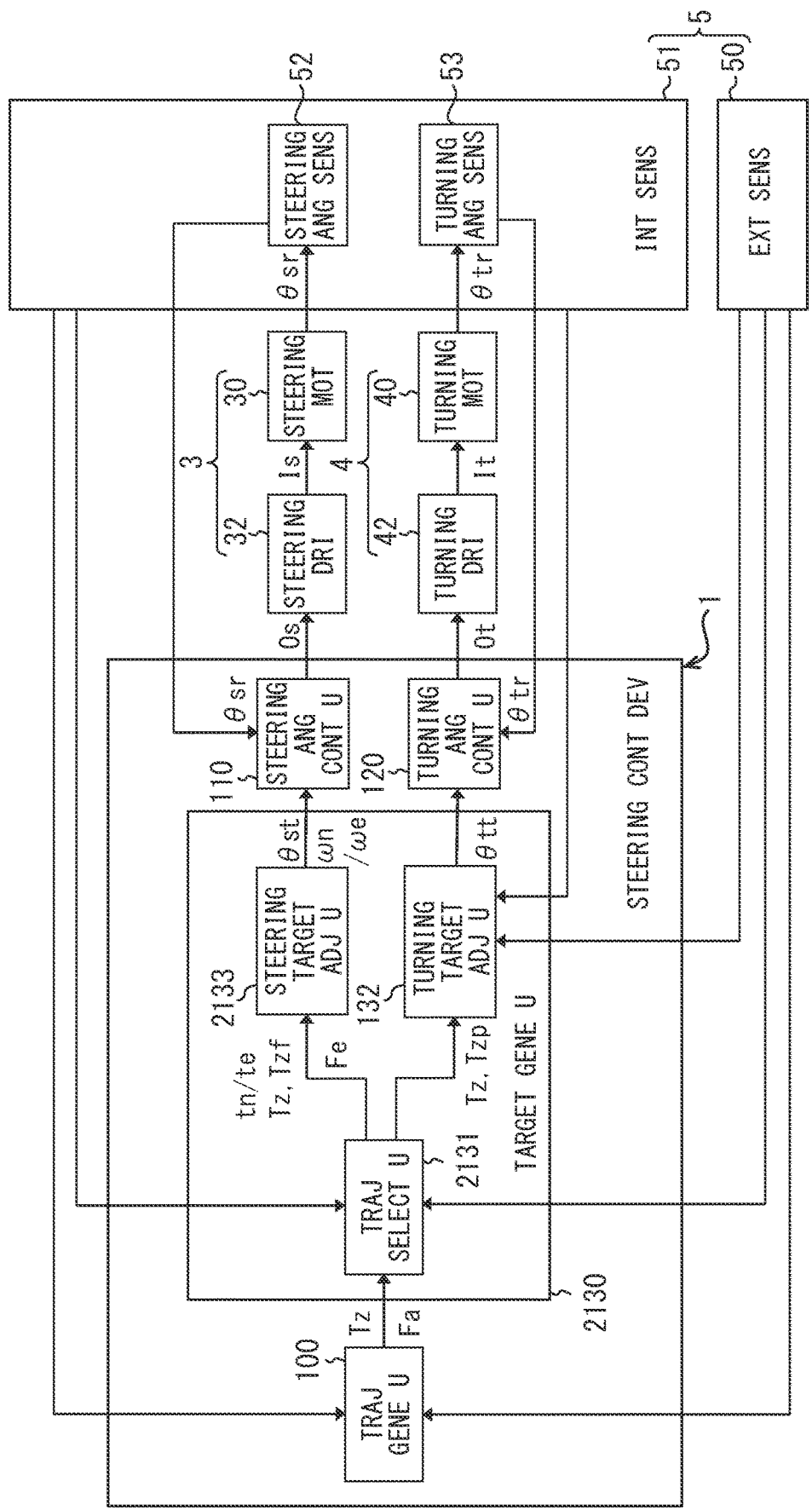
FIG. 10 is a block diagram showing a detail configuration of a steering control device according to a second embodiment.

As shown in FIG. 10, a second embodiment is a modification of the first embodiment.

A trajectory selection unit 2131 in the target generation unit 2130 of the second embodiment has the same function as the trajectory selection unit 131 in the first embodiment, and also determines whether or not an emergency condition is satisfied. Here, the emergency condition is a condition related to the control parameters when emergency motion is applied to the turning wheels 20 in the automatic driving mode. Such an emergency condition is established when at least one of the control parameters in the automatic driving mode included in the automatic driving flag Fa, such as the target turning angle θtt, the angular velocity at the same target turning angle θtt, the traveling speed, and the yaw rate, is out of the allowable range. The trajectory selection unit 2131 adjusts the control time tc from the current control point Pp to the specific future control point Pfs, which is one of the future control points Pf, according to the emergency condition determination result.

Specifically, when the emergency condition is not satisfied, the trajectory selection unit 2131 sets the control time tc from the current control point Pp to the specific future control point Pfs to the normal value tn. Here, the normal value tn is adjusted to a fixed or variable value, for example several seconds. By setting the normal value tn in this manner, the trajectory selection unit 2131 sets the planned trajectory Tzf at the specific future control point Pfs corresponding to the normal value tn to be the planned trajectory Tz to be input into the steering target adjustment unit 2133 in the target generation unit 2130 of the second embodiment. On the other hand, for example, when an emergency condition is met due to emergency avoidance of an obstacle, the trajectory selection unit 2131 sets the control time tc to the emergency value te. Here, when the normal value tn is a fixed value, the emergency value te is adjusted to a fixed value or a variable value so as to be shorter than the fixed normal value. Alternatively, when the normal value tn is a variable value, the emergency value te is adjusted to a fixed value or a variable value so as to be shorter than the shortest value of the same variable normal value. In any of these, the trajectory selection unit 2131 selects the planned trajectory Tzf at the specific future control point Pfs corresponding to the same emergency value te to be the planned trajectory Tz to be given to the steering target adjustment unit 133.

The emergency condition determination result by the trajectory selection unit 2131 is input to the steering target adjustment unit 2133 as an emergency flag Fe. The steering target adjustment unit 2133 has the same function as the steering target adjustment unit 133 in the first embodiment, and also adjusts the angular velocity that becomes the time rate of change at the target steering angle θst that follows the planned trajectory Tzf at the specific future control point Pfs, according to the emergency condition determination result.

Specifically, when the emergency condition is not satisfied, the steering target adjustment unit 2133 sets the angular velocity at the target steering angle θst, to be input into the steering angle control unit 110 with adjusting with respect to the specific future control point Pfs, to the normal value ωn. Here, the normal value ωn is adjusted to a fixed value or a variable value. On the other hand, when the emergency condition is established, the steering target adjustment unit 2133 sets the angular velocity at the target steering angle θst with respect to the specific future control point Pfs to the emergency value we. Here, when the normal value ωn is a fixed value, the emergency value we is adjusted to a fixed value or a variable value smaller than the fixed value. Alternatively, when the normal value tn is a variable value, the emergency value te is adjusted to a fixed value or a variable value that is smaller than the minimum value of the same variable normal value.

Figure 11:
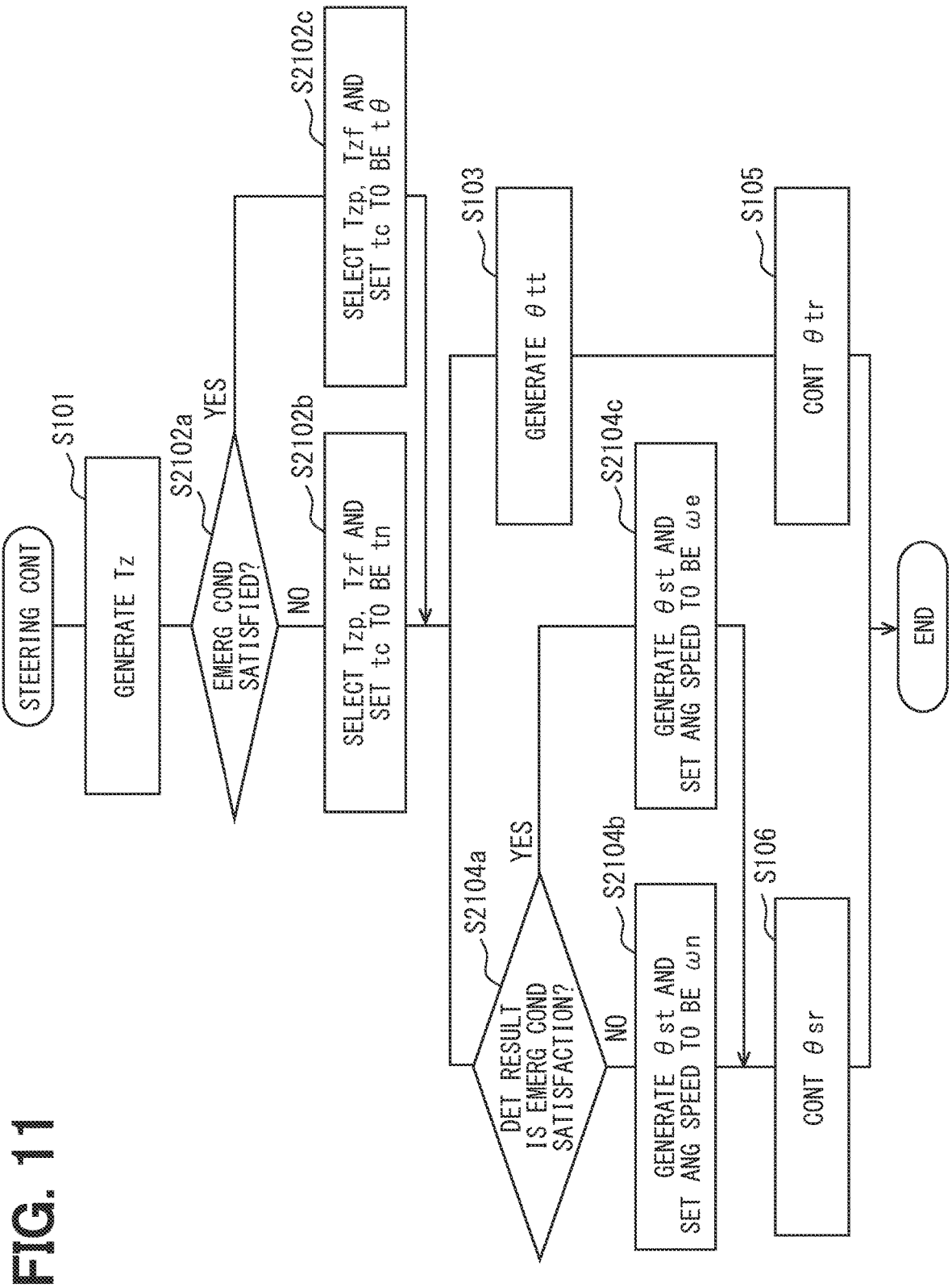
FIG. 11 is a flowchart illustrating a steering control method according to the second embodiment.

In the flow of the steering control method according to the second embodiment, as shown in FIG. 11, S2102*a*, S2102*b*, and S2102*c* are executed instead of S102 of the first embodiment. In S2102*a*, the trajectory selection unit 2131 determines whether or not an emergency condition is satisfied. As a result, in S2012*b*, when a negative determination is made, the trajectory selection unit 2131 selects the planned trajectory Tzf at the specific future control point Pfs to be input into the steering target adjustment unit 2133 under a condition that the control time tc is set to the normal value tn, together with planned trajectory Tzp at the current control point Pp to be given to the turning target adjustment unit 132. On the other hand, in S2012*c*, when the affirmative determination is made, the trajectory selection unit 2131 selects the planned trajectory Tzf at the specific future control point Pfs to be input into the steering target adjustment unit 2133 under a condition that the control time tc is set to the emergency value te, together with planned trajectory Tzp at the current control point Pp to be given to the turning target adjustment unit 132.

Furthermore, in the flow of the steering control method according to the second embodiment, S2104*a*, S2104*b*, and S2104*c* are executed instead of S104 of the first embodiment. In S2104*a*, the steering target adjustment unit 2133 determines whether or not the determination result indicated by the emergency flag Fe indicates that the emergency condition is satisfied. As a result, in S2014*b*, when a negative determination is made, the steering target adjustment unit 2133 sets the angular velocity at the target steering angle θst to the normal value ωn, together with generating the target steering angle θst to be given to the steering angle control unit 110 according to the planned trajectory Tzf at the specific future control point Pfs. On the other hand, in S2014*c*, when the affirmative determination is made, the steering target adjustment unit 2133 sets the angular velocity at the target steering angle θst to the emergency value we, together with generating the target steering angle θst to be given to the steering angle control unit 110 according to the planned trajectory Tzf at the specific future control point Pfs.

In such a second embodiment, S103, S2102*a*, S2102*b*, S2102*c*, S2104*a*, S2104*b*, and S2104*c* correspond to the "target generating step".

(Operation Effects)

The operation and effect of the second embodiment described above will be described below.

According to the second embodiment, when the emergency condition for instructing the emergency action to the turning wheels 20 is met, the control time tc from the current control point Pp to the future control point Pf (specifically, the specific future control point Pfs) is adjusted to be shorter than when the emergency condition is not met. As a result, immediately before the emergency action of the turning wheels 20, it is possible to quickly inform the occupant of the future actual turning angle θtr and the corresponding actual steering angle θsr due to the emergency action. Therefore, it is possible to increase the sense of security for the future behavior of the occupants in the emergency situation in the automatic driving mode of the vehicle 2.

According to the second embodiment, when an emergency condition for giving an emergency motion to the turning wheels 20 is established, the angular velocity of the target steering angle θst at the future control point Pf (specifically, the specific future control point Pfs) is is adjusted to be smaller than when the emergency condition is not established. As a result, immediately before the emergency movement of the turning wheels 20, it is possible to quickly notify the future actual turning angle θtr and the corresponding actual steering angle θsr due to the emergency movement according to the target steering angle θst, which is changed with a small angular velocity that does not give the occupant a sense of uneasiness. Therefore, it is possible to increase the sense of security for the future behavior of the occupants in the emergency situation in the automatic driving mode of the vehicle 2.

Third Embodiment

Figure 12:
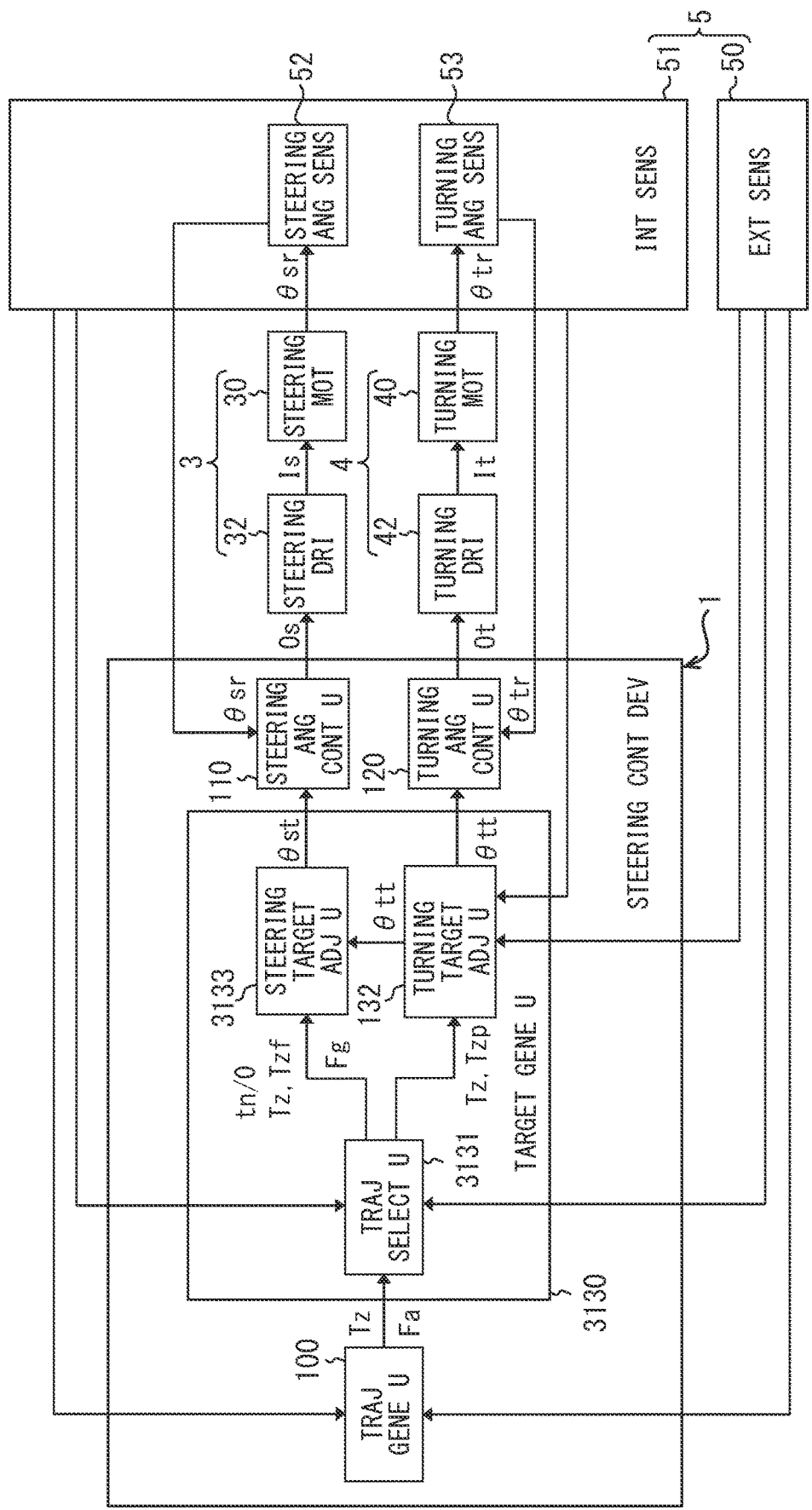
FIG. 12 is a block diagram showing a detail configuration of a steering control device according to a third embodiment.
Figure 13:
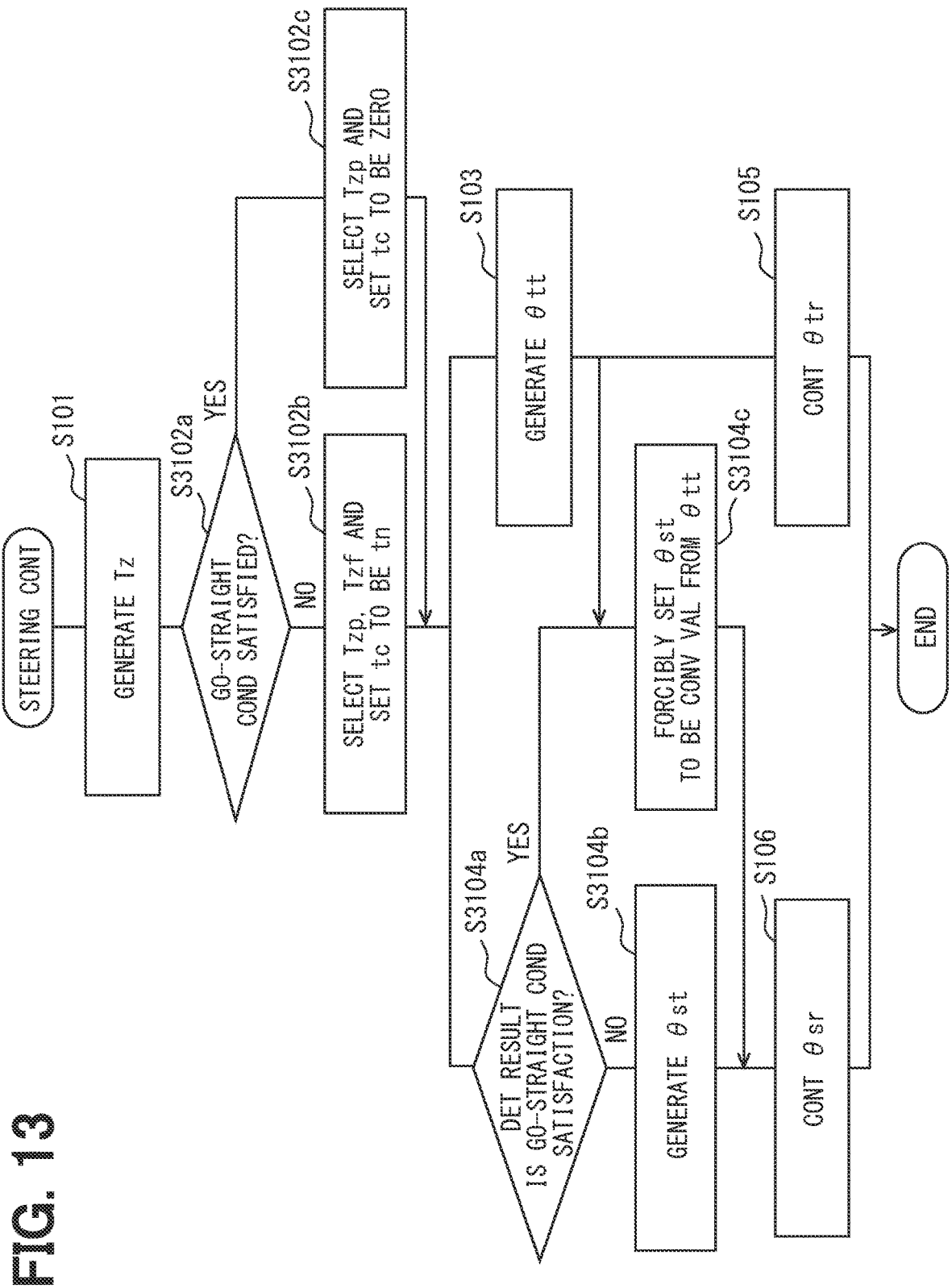
FIG. 13 is a flowchart illustrating a steering control method according to the third embodiment.

A third embodiment shown in FIG. 12 is a modification of the first embodiment.

A trajectory selection unit 3131 in the target generation unit 3130 of the third embodiment has the same function as the trajectory selection unit 131 in the first embodiment, and also determines whether or not a go-straight condition is satisfied. Here, the go-straight condition is a condition related to the control parameters when the go-straight motion is applied to the turning wheels 20 in the automatic driving mode. Such a go-straight condition is established when at least one of the control parameters in the automatic driving mode included in the automatic driving flag Fa, such as the target turning angle θtt, the angular velocity at the same target turning angle θtt, the traveling speed, and the yaw rate, is equal to the value when the vehicle goes straight. The trajectory selection unit 3131 adjusts the control time tc from the current control point Pp to the specific future control point Pfs, which is one of the future control points Pf, according to the go-straight condition determination result.

Specifically, for example, when the go-straight condition is not met prior to a lane change, curve travel, right/left turn, or the like, the trajectory selection unit 3131 sets the control time tc from the current control point Pp to the specific future control point Pfs to the normal value tn. Here, the normal value tn is adjusted to a fixed or variable value, for example several seconds. By setting the normal value tn in this manner, the trajectory selection unit 3131 sets the planned trajectory Tzf at the specific future control point Pfs corresponding to the normal value tn to be the planned trajectory Tz to be input into the steering target adjustment unit 3133 in the target generation unit 3130 of the third embodiment. On the other hand, when the go-straight condition is satisfied, the trajectory selection section 3131 forcibly sets the control time tc to a zero value of 0 seconds. Here, when the normal value tn is a fixed value, the zero value is shorter than the fixed normal value. Alternatively, when the normal value tn is a variable value, the zero value is shorter than the shortest value of the same variable normal value. In any of these cases, the trajectory selection unit 3131, by forcibly setting the zero value, selects the planned trajectory Tzp at the current control point Pp, which can be regarded as the specific future control point Pfs with the control time tc of 0 seconds, to be the planned trajectory Tz to be given to the target adjustment unit 133.

The steering target adjustment unit 3133 receives the determination result of the go-straight condition by the trajectory selection unit 3131 as a go-straight flag Fg. The steering target adjustment unit 3133 switches the target steering angle θst according to the determination result of the go-straight condition between the value according to the planned trajectory Tzf at the specific future control point Pfs and a conversion value from the target turning angle θtt according to the planned trajectory Tzp at the current control point Pp. At this time, the value according to the planned trajectory Tzf at the specific future control point Pfs is adjusted by the same function as the steering target adjustment unit 133 in the first embodiment. On the other hand, the conversion value from the target turning angle θtt according to the planned trajectory Tzp at the current control point Pp is adjusted by multiplying the control angle ratio between the actuators 3, 4 with respect to the target turning angle θtt determined by the steering target adjustment unit 132 to be input into the steering target adjustment unit 3133.

Specifically, when the go-straight condition is not satisfied, the steering target adjustment unit 3133 sets the target steering angle θst, to be input into the steering angle control unit 110 according to the planned trajectory Tzf input from the trajectory selection unit 3131, to the value at the specific future control point Pfs. On the other hand, when the go-straight condition is established, the steering target adjustment unit 3133 sets the target steering angle θst, to be input into the steering angle control unit 110 according to the planned trajectory Tzf input from the trajectory selection unit 3131, to the conversion value from the target turning angle θtt at the current control point Pp.

In the flow of the steering control method according to the third embodiment, as shown in FIGS. 13, 53102a, 53102b, and 53102c are executed instead of S102 of the first embodiment. In 53102a, the trajectory selection unit 3131 determines whether or not an go-straight condition is satisfied. As a result, in S3012b, when a negative determination is made, the trajectory selection unit 3131 selects the planned trajectory Tzf at the specific future control point Pfs to be input into the steering target adjustment unit 3133 under a condition that the control time tc is set to the normal value tn, together with planned trajectory Tzp at the current control point Pp to be given to the turning target adjustment unit 132. On the other hand, in S3012c, when the affirmative determination is made, the trajectory selection unit 3131 selects the planned trajectory Tzp at the current control point Pp for which the control time tc is forcibly set to be zero so as to be given to the steering target adjustment unit 3133, together with the planned trajectory Tzp at the current control point Pp to be given to the turning target adjustment unit 132.

Furthermore, in the flow of the steering control method according to the third embodiment, S3104a, S3104b, and S3104c are executed instead of S104 of the first embodiment. In S3104a, the steering target adjustment unit 3133 determines whether or not the determination result represented by the go-straight flag Fg indicates that the go-straight condition is met. As a result, in S3014b, when a negative determination is made, the steering target adjustment unit 3133 generates the target steering angle θst to be given to the steering angle control unit 110 according to the planned trajectory Tzf at the specific future control point Pfs. On the other hand, in S3014c, when the affirmative determination is made, the steering target adjustment unit 3133 forcibly sets the target steering angle θst, to be given to the steering angle control unit 110 according to the planned trajectory Tzp at the current control point Pp, to be the converted value from the target turning angle θtt according to the planned trajectory Tzp in S103.

In such a third embodiment, S103, 53102a, 53102b, 53102c, S3104a, S3104b, and S3104c correspond to the "target generating step".

(Operation Effects)

The operation and effect of the third embodiment described above will be described below.

According to the third embodiment, the control time tc from the current control point Pp to the future control point Pf (specifically, the specific future control point Pfs) is forcibly set to zero value when the go-straight condition for instructing the go-straight motion to the turning wheels 20 is established. As a result, when the vehicle with the turning wheels 20 goes straight in the go-straight motion, the occupant can be notified of the current actual steering angle θtr and the corresponding actual steering angle θsr due to the go-straight motion. Therefore, in the automatic driving mode of the vehicle 2, it is possible to increase the sense of security of the occupant in go-straight travelling in which behavioral changes are unlikely to occur.

According to the third embodiment, the target steering angle θst is forced to the conversion value from the target turning angle θtt at the current control point Pp when the go-straight condition for instructing the go-straight motion to the turning wheels 20 is satisfied. As a result, when the vehicle with the turning wheels 20 goes straight in the go-straight motion, the occupant can be notified of the current actual steering angle θtr and the corresponding actual steering angle θsr due to the go-straight motion. Therefore, in the automatic driving mode of the vehicle 2, it is possible to increase the sense of security of the occupant in go-straight travelling in which behavioral changes are unlikely to occur.

Fourth Embodiment

Figure 14:
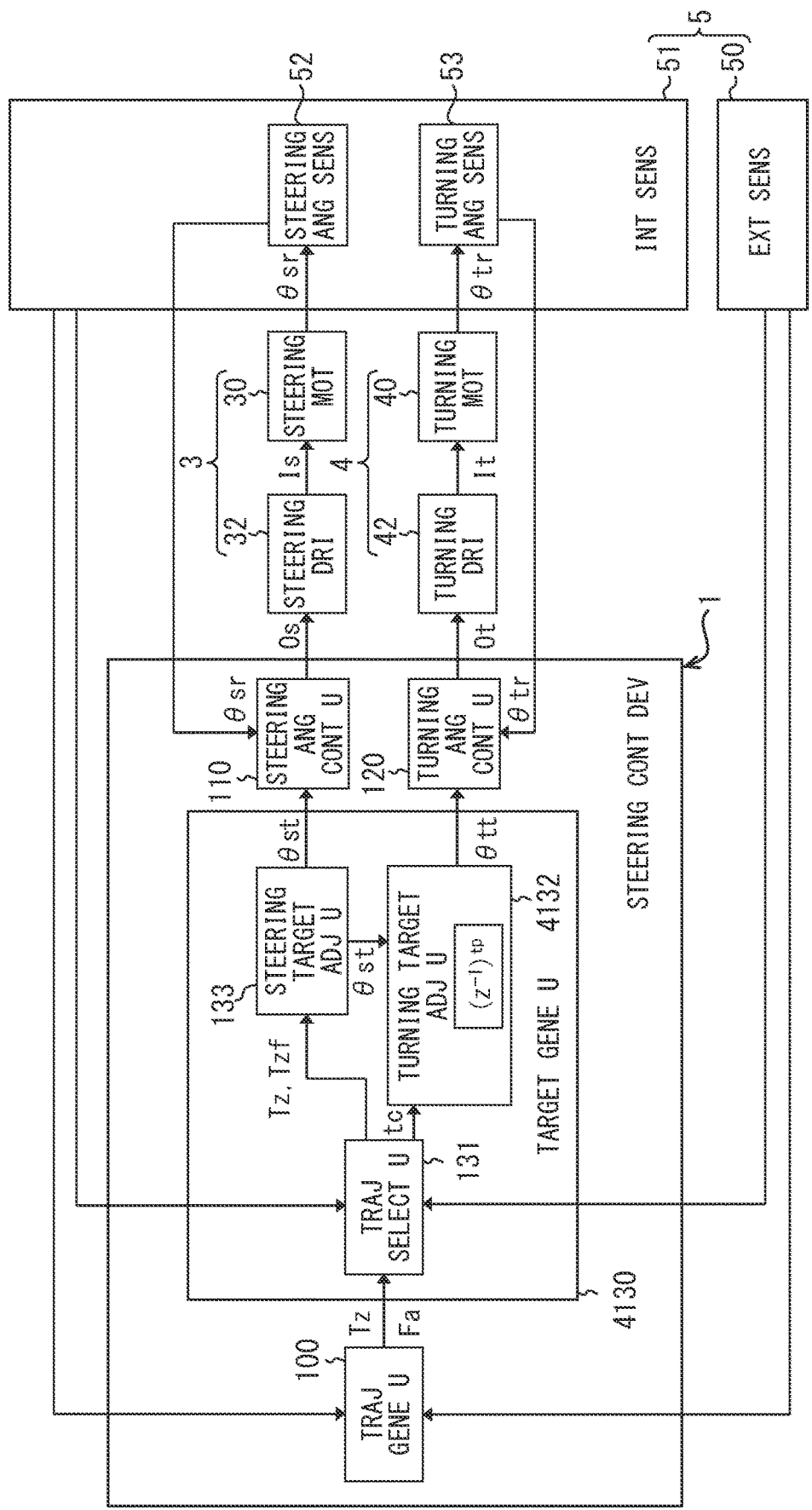
FIG. 14 is a block diagram showing a detail configuration of a steering control device according to a fourth embodiment.

A fourth embodiment shown in FIG. 14 is a modification of the first embodiment.

The target steering angle θst at the specific future control point Pfs, which is one of the future control points Pf, is input from the steering target adjustment unit 133 to the turning target adjustment unit 4132 in the target generation unit 4130 of the fourth embodiment. Further, the control time tc from the current control point Pp to the specific future control point Pfs is input from the trajectory selection unit 131 to the turning target adjustment unit 4132. The turning target adjustment unit 4132 delays the phase of the target steering angle θst at the specific future control point Pfs by an amount corresponding to the control time tc. As a result, the turning target adjustment unit 4132 provides the value prepared by delaying the phase with respect to the target steering angle θst at the specific future control point Pfs, as the target turning angle θtt at the current control point Pp to be input into the turning angle control unit 120.

Figure 15:
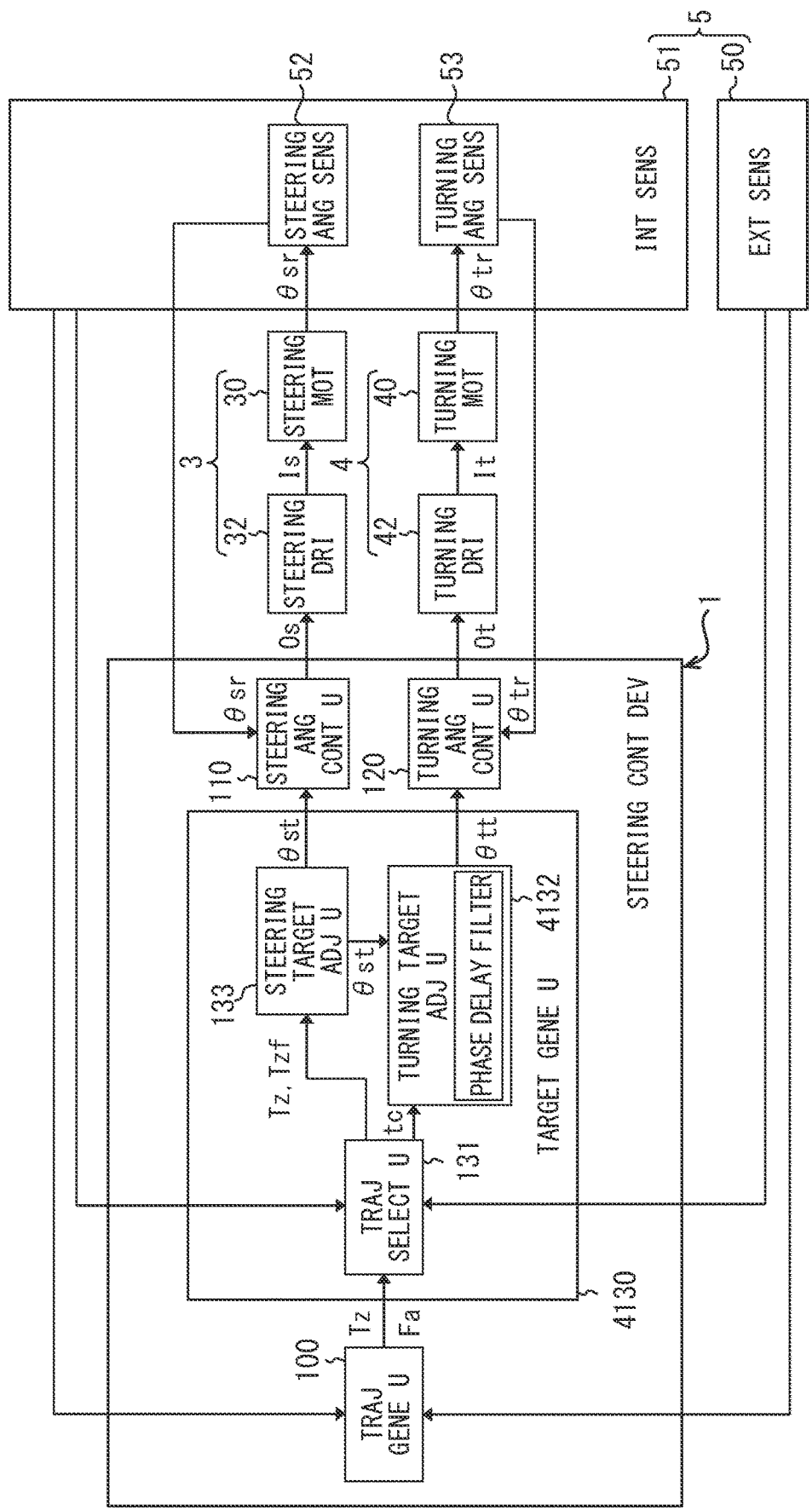
FIG. 15 is a block diagram showing another configuration of a steering control device according to a fourth embodiment.

At this time, as shown in FIG. 14, the turning target adjustment unit 4132 may delay the phase of the target turning angle θtt at the current control point Pp using the delay control for the target steering angle θst at the specific future control point Pfs by the amount of the control cycles tp. Alternatively, as shown in FIG. 15, the turning target adjustment unit 4132 may delay the phase of the target turning angle θtt at the current control point Pp using the phase delay filter with respect to the target steering angle θst at the specific future control point Pfs.

Figure 16:
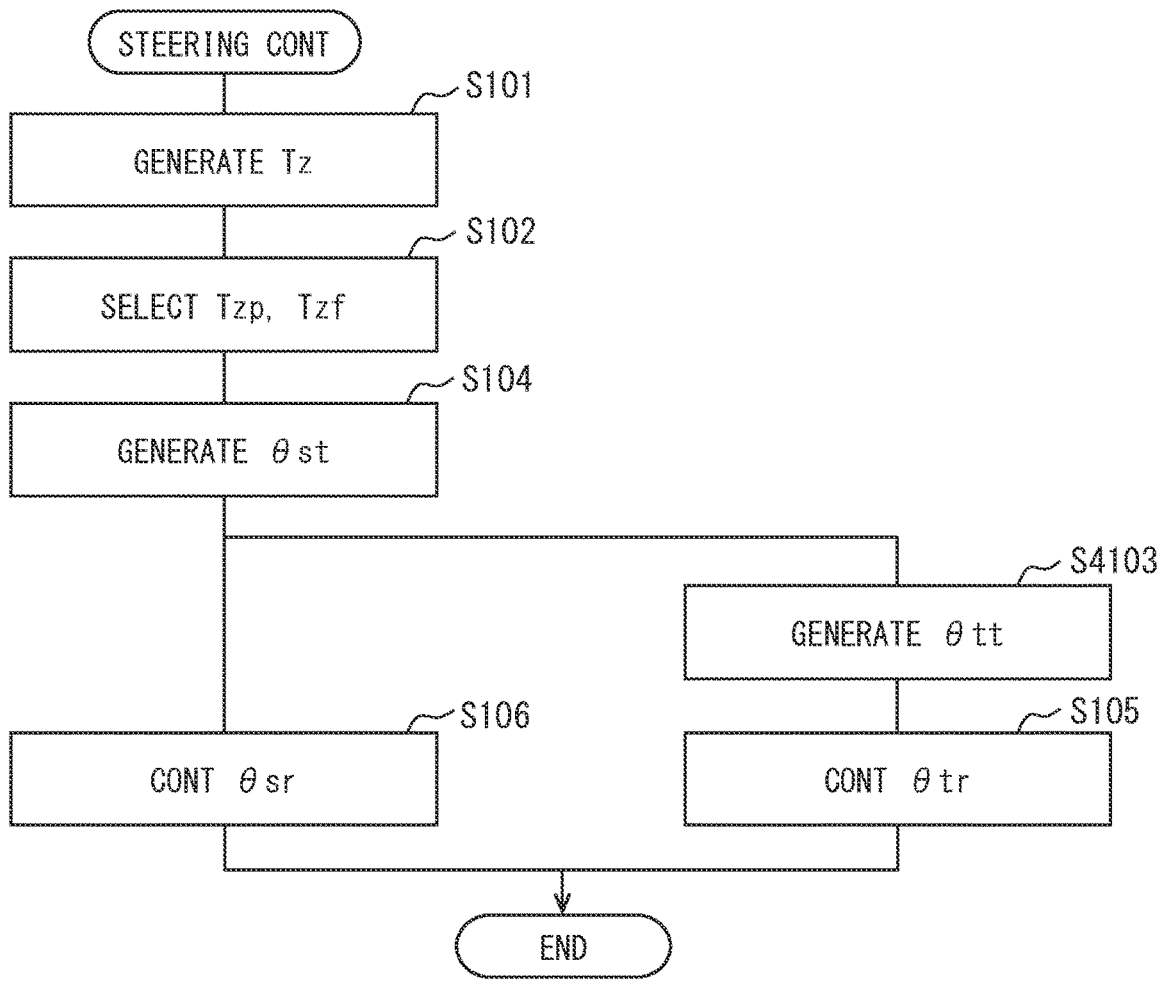
FIG. 16 is a flowchart illustrating a steering control method according to the fourth embodiment.

In the flow of the steering control method according to the fourth embodiment, as shown in FIG. 16, S4103 following S104 is executed instead of S103 of the first embodiment. In S4103, the turning target adjustment unit 4132 generates the target turning angle θtt at the current control point Pp by the phase delay process with respect to the target steering angle θst at the specific future control point Pfs input from the steering target adjustment unit 133.

In such a fourth embodiment, S102, S104 and S4103 correspond to the "target generating step".

(Operation Effects)

The operation and effect of the fourth embodiment described above will be described below.

According to the fourth embodiment, the target turning angle θtt at the current control point Pp on the planned trajectory Tz is generated by delaying the phase with respect to the target steering angle θst at the future control point Pf (specifically, the specific future control point) ahead of the current control point Pp on the planned trajectory Tz. According to this, since the actual steering angle θtr is controlled according to the target turning angle θtt at the current control point Pp earlier than the actual turning angle θtr is controlled according to the target turning angle θtt at the future control point Pf, the actual steering angle θsr is controlled according to the target steering angle θst at the future control point Pf. Therefore, it is possible to inform the passenger of the future actual steering angle θtr and the corresponding actual steering angle θsr in advance, thereby increasing the sense of security in the automatic driving mode of the vehicle 2.

Fifth Embodiment

Figure 17:
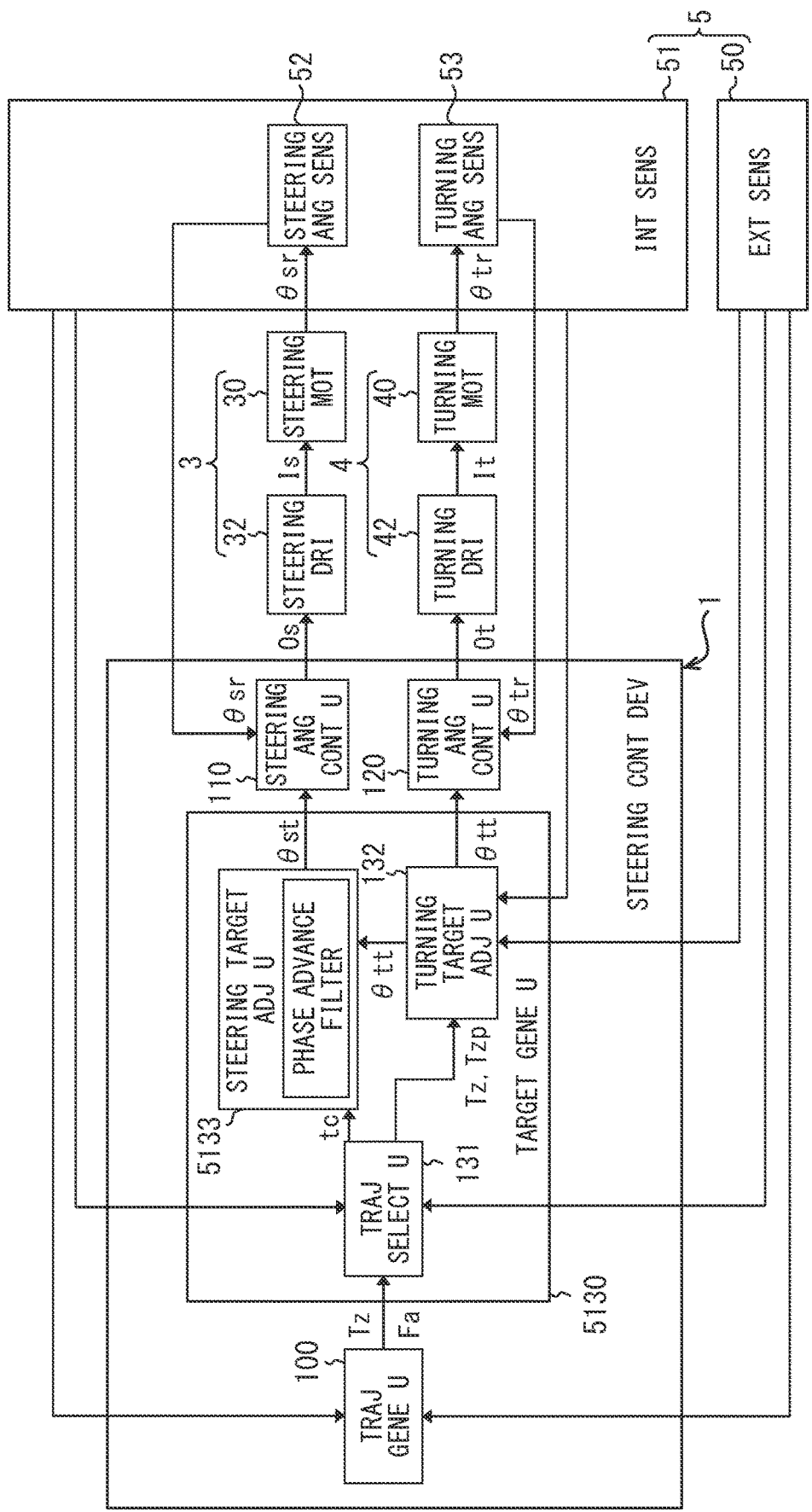
FIG. 17 is a block diagram showing a detail configuration of a steering control device according to a fifth embodiment.

A fifth embodiment shown in FIG. 17 is a modification of the first embodiment.

The target steering angle θtt at the current control point Pp is input from the turning target adjustment unit 132 to the steering target adjustment unit 5133 in the target generation unit 5130 of the fifth embodiment. Further, the control time tc from the current control point Pp to the specific future control point Pfs, which is one of the future control points Pf, is input from the trajectory selection unit 131 to the steering target adjustment unit 5133. The steering target adjustment unit 5133 advances the phase of the turning steering angle θtt at the current control point Pp by an amount corresponding to the control time tc. As a result, the steering target adjustment unit 5133 provides the value prepared by advancing the phase with respect to the target turning angle θtt at the current control point Pp, as the target steering angle θst at the specific future control point Pfs to be input into the steering angle control unit 110.

At this time, as shown in FIG. 17, the steering target adjustment unit 5133 may generate the target steering angle θst at the specific future control point Pfs whose phase is advanced, using the differential operation type phase advance filter with respect to the target turning angle θtt at the current control point Pp.

Figure 18:
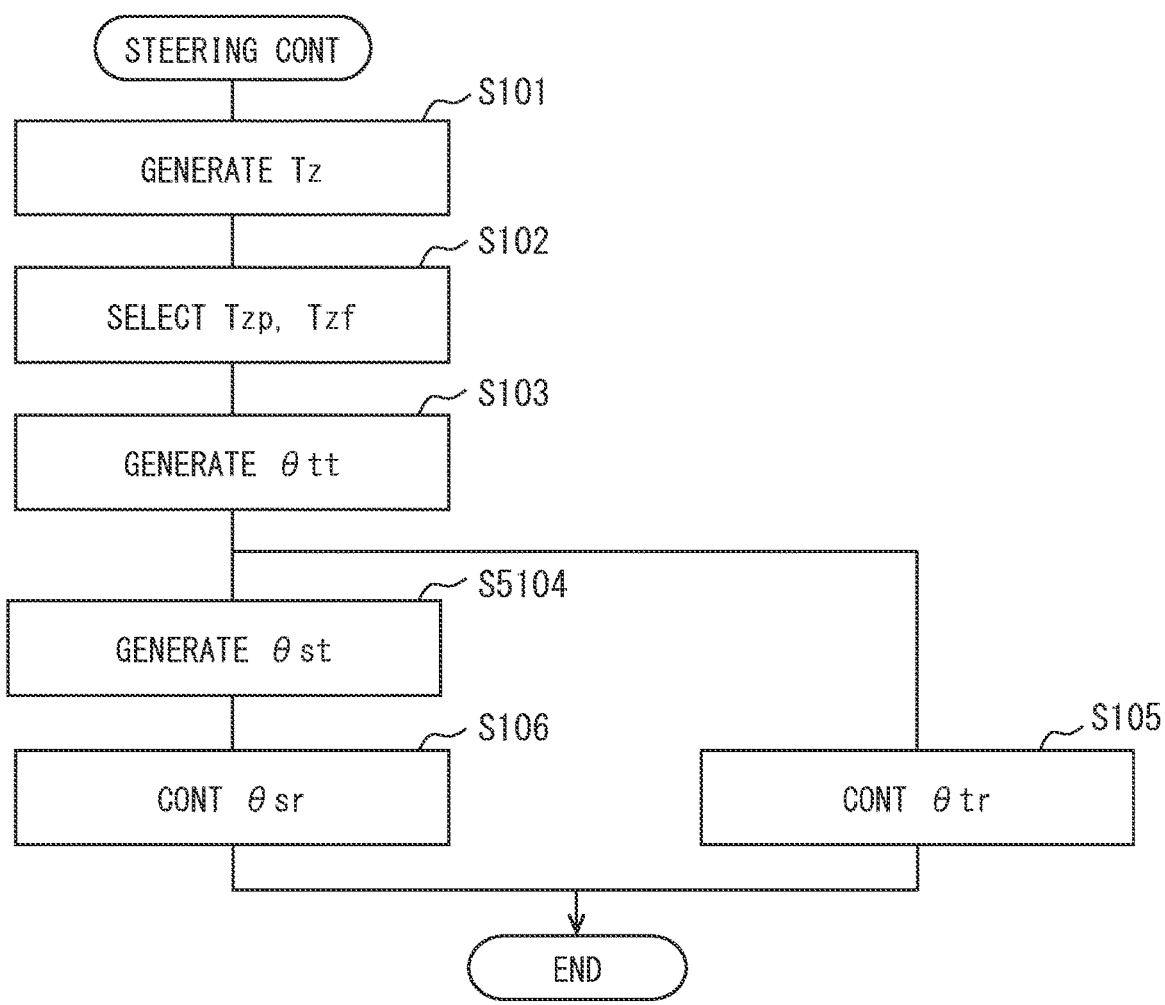
FIG. 18 is a flowchart illustrating a steering control method according to the fifth embodiment.

In the flow of the steering control method according to the fifth embodiment, as shown in FIG. 18, S5104 following S103 is executed instead of S104 of the first embodiment. In S5104, the steering target adjustment unit 5133 generates the target steering angle θst at the specific future control point Pfs by the phase advance process with respect to the target turning angle θtt at the current control point Pp input from the turning target adjustment unit 132.

In such a fifth embodiment, S102, S103 and S5104 correspond to the "target generating step".

(Operation Effects)

The operation and effect of the fifth embodiment described above will be described below.

According to the fifth embodiment, the target steering angle θst at the future control point Pf (specifically, the specific future control point Pfs) ahead of the current control point Pp on the planned trajectory Tz is generated by advancing the phase with respect to the target turning angle θtt at the current control point Pp on the planned trajectory Tz. According to this, since the actual steering angle θtr is controlled according to the target turning angle θtt at the current control point Pp earlier than the actual turning angle θtr is controlled according to the target turning angle θtt at the future control point Pf, the actual steering angle θsr is controlled according to the target steering angle θst at the future control point Pf. Therefore, it is possible to inform the passenger of the future actual steering angle θtr and the corresponding actual steering angle θsr in advance, thereby increasing the sense of security in the automatic driving mode of the vehicle 2.

Other Embodiments

Although multiple embodiments have been described above, the present disclosure is not construed as being limited to those embodiments, and can be applied to various embodiments and combinations within a scope that does not depart from the spirit of the present disclosure.

The turning actuator 4 of the modified example may constitute a power steering system that is mechanically linked to the steering wheel 21 and the steering actuator 3 and is controllable independently of the actuator 3.

The dedicated computer of the steering control device 1 in a modification example may be at least one outside center computer communicating with the vehicle 2. The dedicated computer of the steering control device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In a modification of the second embodiment, after S102 of the first embodiment is executed instead of S2102a, S2102b, and S2102c, S2102a may be executed instead of S2104a. In a modification of the second embodiment, S104 of the first embodiment may be executed instead of S2104a, S2104b, and S2104c.

In a modification of the third embodiment, after S102 of the first embodiment is executed instead of 53102a, 53102b, and 53102c, 53102a may be executed instead of S3104a. In a modification of the third embodiment, S104 of the first embodiment may be executed instead of S3104a, S3104b, and S3104c.

In a modification, the second embodiment and the third embodiment may be combined. Alternatively, the second embodiment may be combined with the fourth or fifth embodiment. Alternatively, the third embodiment may be combined with the fourth or fifth embodiment.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A steering control device for controlling and linking a movement of a steering member by a steering actuator and a movement of a turning wheel by a turning actuator in an automatic driving mode of a vehicle, the steering control device comprising:
   a steering angle control unit that is configured to control an actual steering angle of the steering member via the steering actuator;
   a turning angle control unit that is configured to control an actual turning angle of the turning wheel via the turning actuator; and
   a target generation unit that is configured to generate a target steering angle, which is a control target for the actual steering angle, and a target turning angle, which is a control target for the actual turning angle, wherein:
   before the turning angle control unit controls the actual turning angle toward the target turning angle to follow a planned trajectory scheduled for the vehicle, the steering angle control unit controls the actual steering angle toward the target steering angle to follow the planned trajectory.

2. The steering control device according to claim 1, wherein:
   the target generation unit is configured to generate the target steering angle at a future control point after a current control point on the planned trajectory, in conjunction with generation of the target turning angle at the current control point on the planned trajectory.

3. The steering control device according to claim 1, wherein:
   the target generation unit is configured to generate the target turning angle at a current control point on the planned trajectory by delaying a phase with respect to the target steering angle at a future control point after the current control point on the planned trajectory.

4. The steering control device according to claim 1, wherein:
   the target generation unit generates the target steering angle at a future control point after a current control point on the planned trajectory by advancing a phase with respect to the target turning angle at the current control point on the planned trajectory.

5. The steering control device according to claim 2, wherein:
   the target generation unit adjusts a control time from the current control point to the future control point according to a control parameter in the automatic driving mode.

6. The steering control device according to claim 2, wherein:
   when an emergency condition for instructing an emergency motion to the turning wheel is satisfied, the target generation unit adjusts a control time from the current control point to the future control point to be shorter than when the emergency condition is not satisfied.

7. The steering control device according to claim 2, wherein:
   when an emergency condition for instructing an emergency motion to the turning wheel is satisfied, the target generation unit adjusts an angular velocity at the target steering angle at the future control point to be smaller than when the emergency condition is not satisfied.

8. The steering control device according to claim 2, wherein:
   when a go-straight condition for instructing a go-straight motion to the turning wheel is satisfied, the target generation unit forcibly sets a control time from the current control point to the future control point to be zero.

9. The steering control device according to claim 2, wherein:
   when a go-straight condition for instructing a go-straight motion to the turning wheel is satisfied, the target generation unit forcibly sets the target steering angle to be a conversion value from the target turning angle at the current control point.

10. The steering control device according to claim 1, further comprising:
    one or more processors; and
    a memory coupled to the one or more processors and storing program instructions that when executed by the one or more processors cause the one or more processors to provide at least: the steering angle control unit; the turning angle control unit; and the target generation unit.

11. A steering control method for controlling and linking a movement of a steering member by a steering actuator and a movement of a turning wheel by a turning actuator in an automatic driving mode of a vehicle, the steering control method comprising:
controlling an actual steering angle θf the steering member via the steering actuator;
controlling an actual turning angle θf the turning wheel via the turning actuator; and
generating a target steering angle, which is a control target for the actual steering angle, and a target turning angle, which is a control target for the actual turning angle, wherein:
before the actual turning angle is controlled toward the target turning angle to follow a planned trajectory scheduled for the vehicle in the controlling of the actual turning angle, the actual steering angle is controlled toward the target steering angle to follow the planned trajectory in the controlling of the actual steering angle.

12. The steering control method according to claim 11, wherein:
the generating of the target steering angle and the target turning angle includes: generating the target steering angle at a future control point after a current control point on the planned trajectory, in conjunction with generation of the target turning angle at the current control point on the planned trajectory.

13. The steering control method according to claim 11, wherein:
the generating of the target steering angle and the target turning angle includes: generating the target turning angle at a current control point on the planned trajectory by delaying a phase with respect to the target steering angle at a future control point after the current control point on the planned trajectory.

14. The steering control method according to claim 11, wherein:
the generating of the target steering angle and the target turning angle includes: generating the target steering angle at a future control point after a current control point on the planned trajectory by advancing a phase with respect to the target turning angle at the current control point on the planned trajectory.

15. The steering control method according to claim 12, wherein:
the generating of the target steering angle and the target turning angle includes: adjusting a control time from the current control point to the future control point according to a control parameter in the automatic driving mode.

16. The steering control method according to claim 12, wherein:
when an emergency condition for instructing an emergency motion to the turning wheel is satisfied, the generating of the target steering angle and the target turning angle includes: adjusting a control time from the current control point to the future control point to be shorter than when the emergency condition is not satisfied.

17. The steering control method according to claim 12, wherein:
when an emergency condition for instructing an emergency motion to the turning wheel is satisfied, the generating of the target steering angle and the target turning angle includes: adjusting an angular velocity at the target steering angle at the future control point to be smaller than when the emergency condition is not satisfied.

18. The steering control method according to claim 12, wherein:
when a go-straight condition for instructing a go-straight motion to the turning wheel is satisfied, the generating of the target steering angle and the target turning angle includes: forcibly setting a control time from the current control point to the future control point to be zero.

19. The steering control method according to claim 12, wherein:
when a go-straight condition for instructing a go-straight motion to the turning wheel is satisfied, the generating of the target steering angle and the target turning angle includes: forcibly setting the target steering angle to be a conversion value from the target turning angle at the current control point.

20. A non-transitory tangible computer readable storage medium comprising instructions being executed by a computer, the instructions including a computer-implemented method for controlling and linking a movement of a steering member by a steering actuator and a movement of a turning wheel by a turning actuator in an automatic driving mode of a vehicle, the instructions including:
controlling an actual steering angle θf the steering member via the steering actuator;
controlling an actual turning angle θf the turning wheel via the turning actuator; and
generating a target steering angle, which is a control target for the actual steering angle, and a target turning angle, which is a control target for the actual turning angle, wherein:
before the actual turning angle is controlled toward the target turning angle to follow a planned trajectory scheduled for the vehicle in the controlling of the actual turning angle, the actual steering angle is controlled toward the target steering angle to follow the planned trajectory in the controlling of the actual steering angle.

* * * * *